350-3.74 SR
OR 3,754,807
1 3045Y
X 3054W

United St[ates Patent]
McMahon et a[l.]

[11] 3,754,807
[45] Aug. 28, 1973

[54] PHASE MODULATION HOLOGRAPHIC DATA RECORDING APPARATUS

[75] Inventors: Donald H. McMahon, Carlisle; James Bruce Thaxter, Townsend, both of Mass.

[73] Assignee: Sperry Rand Corporation, New York, N.Y.

[22] Filed: Dec. 6, 1971

[21] Appl. No.: 204,808

[52] U.S. Cl. .................................. 350/3.5, 346/108
[51] Int. Cl. ............................................ G02b 27/00
[58] Field of Search............... 350/3.5; 340/173 LT, 340/173 LM, 173 SS; 346/108

[56] References Cited

UNITED STATES PATENTS

| | | | |
|---|---|---|---|
| 3,614,192 | 10/1971 | Preston | 350/3.5 |
| 3,364,497 | 1/1968 | MacAdam | 346/108 |
| 3,627,401 | 12/1971 | Kirk | 350/3.5 |
| 3,530,442 | 9/1970 | Collier et al. | 350/3.5 |

*Primary Examiner*—David Schonberg
*Assistant Examiner*—Ronald J. Stern
*Attorney*—Howard P. Terry

[57] ABSTRACT

A holographic apparatus for recording digital data comprising a recording medium and means for producing coherently related reference and signal beams in combination with a plurality of phase modulators disposed across the path of the signal beam and each responsive to a discrete bit of the digital data to be recorded. In the absence of electrical excitation applied to the modulators, the entire signal beam would normally interfere with the reference beam to produce high intensity interference fringes. Application of electrical energy representative of discrete digital bits, however, to one or more of the modulators causes the associated portions of the signal beam to be varied in phase such that interference thereof with the reference beam is substantially weakened whereby upon illumination of the developed hologram for readout only the unmodulated parts of the signal beam are reproduced.

7 Claims, 2 Drawing Figures

PHASE MODULATION HOLOGRAPHIC DATA RECORDING APPARATUS

BACKGROUND OF THE INVENTION

1. Field of the Invention

This invention relates generally to holography and more specifically to phase modulation holographic data recording apparatus particularly adapted to recording of digital signal information.

2. Description of the Prior Art

Holographic recording of digital data has been accomplished heretofore by positioning a transparency containing the information to be recorded in the path of one of the coherently related beams customarily used in holographic recording, the information being recorded on the transparency in the form of a two-dimensional array of opaque and transparent segments. In the case of electronic or electro-optical data processing devices, this procedure has the obvious disadvantage of requiring the intermediate step of recording the data on a transparency. Direct holographic recording to electrical signals, however, is not easily implemented. For instance, one technique which could be used would involve the disposition of a plurality of light amplitude modulators in the path of one of the recording beams. Each modulator would correspond to a single digital bit and function in the manner of the transparency so as either to block or transmit light depending on whether the related bit was a ONE or a ZERO. In view of the comparatively large size of available light amplitude modulators, however, construction of such apparatus would require that one of the recording beams either be increased substantially in size or alternatively divided into a number of discrete beams each directed to one of the modulators. It is readily apparent that the resultant structure would become quite elaborate. Accordingly, it is a principal object of the present invention to provide a novel digital data recording apparatus which overcomes the undesirable features of the above-described techniques.

SUMMARY OF THE INVENTION

A preferred embodiment of the present invention comprises the combination of means for prOviding the customary coherently related reference and signal beams used in holographic recording apparatus and a linear array of piezoelectric phase modulators positioned across the path of the signal beam for reflecting incident light onto a holographic recording medium in superposed relation with the reference beam. Each modulator is controlled by an electrical signal representative of a single bit of a multi-bit digital word where a ZERO is represented by the absence of an electrical signal and a ONE by the presence of an electrical signal. Application of electrical energy as representative of a ONE produces motion in the energized piezoelectric modulators while the de-energized, or ZERO bit, modulators remain stationary. As a result of this action, phase modulation is not imparted to the light which impinges on the ZERO bit modulators. Hence, a well-defined interference pattern representative of each ZERO bit (stationary modulator) is recorded on the holographic medium. In the case of the ONE bits, on the other hand, the modulator excitation operates to vibrate or dither the related modulators so as to inhibit formation of representative interference patterns. The net result is that interference patterns are recorded in relation to the ZERO bits but not with respect to the ONE bits.

It will be appreciated that the ONE bits may not be represented by a complete absence of interference fringes but instead by fringes of weak intensity compared to those of the ZERO bits. This will depend on the precise nature of the phase modulation. By judicious selection of the signal excitation representative of a ONE bit, the phase of the signal beam can be caused to average such that essentially no recorded interference occurs between the reference beam and the phase modulated portions of the signal beam. It should also be apparent that the characteristics of the recording can be reversed simply by providing for a ZERO to be represented by the presence of electrical energy for application to the related modulators while a ONE is designated by the absence, or a different level, of electrical excitation. In any event, readout of the recorded data is performed simply by illuminating the hologram with a suitable reference beam whereupon a plurality of discrete signal beams will be produced in a format corresponding to the arrangement of the non-energized modulators.

DESCRIPTION OF THE PREFERRED EMBODIMENT

Figure 1:
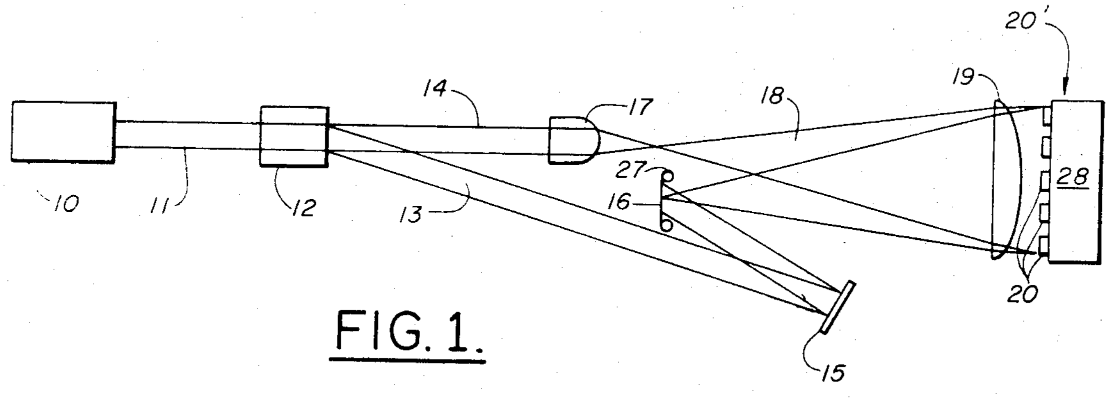
FIG. 1 is a schematic illustration of a preferred embodiment of phase modulation holographic recording apparatus constructed in accordance with the principles of the present invention.

Referring to FIG. 1, laser 10 provides a light beam 11 directed to beamsplitter 12 where the beam is divided into reference and signal beams 13 and 14, respectively. The reference beam propagates onto the mirror 15 from which it is reflected onto a holographic recording medium 16 constructed of photographic film or other suitable recording material. The signal beam 14 propagates through a short focal length lens such as a microscope objective 17 which provides a diverging expanded beam 18. Lens 19, positioned with its front focal plane coincident with the focal plane of the microscope objective, collimates the diverging signal eam and directs it onto the modulator array 20' comprising a plurality of piezoelectric phase modulators 20. Each phase modulator has a mirror surface on which the collimated signal beam impinges at a predetermined angle to the normal to the mirror surfaces, all of the mirrors being aligned in a common plane. The collimated beam is than specularly reflected back through lens 19 and focused on the recording medium in superposed relation with the reference beam. The holder mechanism 28 serves to support all the modulators of the array at some point back from the mirrors so that longitudinal vibration of the piezoelectric elements can occur as will be explained subsequently with reference to FIG. 2.

In the absence of electrical excitation applied to the modulators, each segmental portion of the signal beam reflected from the modulator mirrors would interfere with the reference beam to produce a corresponding fringe pattern representative of the respective mirrors of th modulator array. Reconstruction or readout of the recorded information by illuminating the developed hologram with a beam directed opposite to the reference beam used in recording would then produce the full signal beam at the location of the modulator mirrors. On the other hand, in the presence of electrical excitation applied to one or more of the modulators, the associated segments of the signal beam will be phase modulated so that the interference recorded between the modulated signal beam segments and the reference beam is substantially diminished. In this instance, during readout only the unmodulated segments of the beam will be reproduced. It is thus apparent that digital information can be recorded by associating an individual modulator with each bit of a multi-bit word and readout of the data subsequently accomplished simply by illuminating the developed hologram with an appropriately directed reference beam. Recording space is minimized by focusing the light beams from the phase modulator array to a point on the recording medium. The recorded interference pattern is then the Fourier transform pattern of the unexcited elements of the modulator array.

Figure 2:
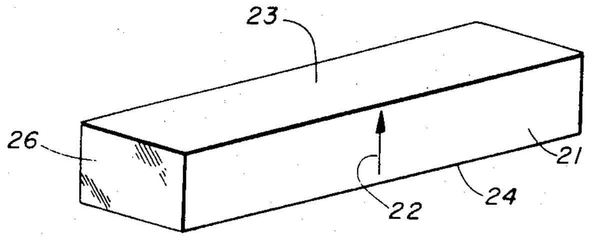
FIG. 2 is a perspective view of a typical phase modulator used in the modulator array of FIG. 1.

Before proceeding with a further description of the operation of the recording apparatus, momentary digression will be made to consider the structural details and mode of operation of the phase modulators. As shown in FIG. 2, each modulator comprises a strip-like piezoelectric ceramic element 21 which may typically measure about 10 mils in cross section and approximately 1 inch in length. The piezoelectric element is poled in a direction transverse to the length dimension as indicated by arrow 22. This can be achieved by using a ferro-electric ceramic which has a permanent or remanent polarization attendant to its square loop voltage versus polarization hysteresis characteristic; or, in the case of a non-ferroelectric, by applying a DC bias potential to the ceramic by means of a battery connected to electrodes 23 and 24 which may be formed on the top and bottom surfaces of the ceramic with a conductive material such as silver paint. One end of the piezoelectric element has a mirror surface finish 26 which can be provided by any of various techniques, for instance affixing a reflective member to the end of the ceramic or polishing and reflection coating the end.

Application of a suitable drive signal to the electrodes causes the piezoelectric element to vibrate in a longitudinal mode whereby it alternately contracts and extends in the direction of its length dimension with reference to a point therealong at which it is fixedly secured. The location of the securing point is not critical but preferably should be remote from the mirror surface to enhance the degree of contraction and extension occurring in response to the drive signal. The large length dimension of the ceramic provides increased length changes for a given change in the applied voltage since the length changes are proportional to both the nominal ceramic length and applied voltage. The height dimension between electrodes should be made as small as practicable since length change is inversely porpotional to thickness for a given applied voltage. The amplitude of the drive excitation should be held though to a level which will prevent the piezoelectric element from becoming de-polarized. The frequency of the drive excitation should preferably excite the lowest order longitudinal vibrational mode of the ceramic. Thus, the desired vibration may be achieved, for example, with a step signal input to excite the resonant mode or with a sinusoidal signal having a frequency equal to the resonant frequency. If L is the length of the piezoelectric element and v is the velocity of a longitudinal sound wave in the element, then the lowest order resonant frequency is given by $f=v/2L$. With typical values of $v$ and $L$, $f=100$ KHz. Generally though, it has been found advantageous to drive the piezoelectric elements non-resonantly at about 10 KHz to reduce cross-coupling excitation between the individual elements.

In operation of the apparatus of FIG. 1, as hereinbefore explained, the phase modulators act to control the overall holographic pattern produced by interference between the reference beam and discrete segments of the signal beam. When one or more of the piezoelectric elements is excited into a longitudinal vibrationary mode by application of a drive voltage, the recorded interference pattern corresponding to the vibrating mirror is substantially weakened and thus upon playback light will not be produced at the locations corresponding to the vibrating elements. The degree of diminution of the light intensity in playback and whether in fact it will be completely eliminated at the positions corresponding to the vibrating elements, is dependent on the intensity of the associated interference patterns produced during recording. Any mirror motion at all occurring during recording will weaken the recorded intensity of the associated interference pattern as a consequence of the resulting motion of the interference fringes. Under the proper motional conditions, the recording exposure will average the moving interference fringes over a period of time so that the intensity of the recorded interference fringes associated with the vibrating elements is reduced substantially to zero and thus on playback no diffraction corresponding to those elements will be produced. This can be accomplished by driving the mirror in either a randomly or smoothly varying cyclical manner which changes the phase by one half of one wavelength of the light or an odd multiple of half wavelengths. The required mirror motion is, of course, only one half the phase change desired to be produced in view of the reflective mode of operation of the modulators and therefore the minimum required sinusoidal motion of the mirrors for optimized performance is one quarter of the light wavelength. Moreover, since the signal beam is skewed with respect to the normal to the mirror surfaces, the mirror motion will have to be modified in accordance with the cosine of the incident angle to effect the desired phase change.

Returning now to FIG. 1, it is seen that a reel mechanism 27 is provided for moving successive sections of the recording medium into the path of the interfering reference and signal beams. This may be done on a continuous or incremental basis. If a two-dimensional array of phase modulators is used, incremental motion would be preferred. In the case where a vertically disposed linear array of modulators is employed, as shown in the drawing, a continuous motion may be employed to increase the recording speed. In this case though, the interference fringes produced between the reference and signal beam must lie along the direction of motion. Since the fringes resulting from interference between two spatially coherent beams are oriented perpendicular to the plane containing the beams, it is therefore required for continuous recording that the reel mechanism 27 be oriented to cause the recording medium to travel perpendicular to the plane of the drawing, that is, parallel to the fringe lines. In this way, blurring of the fringe pattern will be avoided. A slit oriented perpendicular to the direction of motion of the recording medium in the plane of the interfering beams aids in limiting exposure time and reducing fringe washout caused by the motion of the recording medium.

While the invention has been described in its preferred embodiment, it is to be understood that the words which have been used are words of description rather than limitation and that changes within the purview of the appended claims may be made without departing from the true scope and spirit of the invention in its broadest aspects.

We claim:

1. Phase modulation holographic data recording apparatus for recording binary digital data, comprising a holographic recording medium, means for directing mutually related coherent reference and signal beams onto the recording medium in at least partially superposed angularly separated relation, and a plurality of phase modulators disposed across the path of the signal beam such that each modulator intercepts a discrete segmental part of the signal beam and each modulator being connected to receive a discrete bit of the binary digital signal, one binary state of the respective bits leaving the interference normally occurring in the recording medium between the reference beam and the respective segmental parts of the signal beam unaffected and the other binary state of the respective bits serving to actuate the related modulator to vibrate the phase of the segmental beam part intercepted thereby during exposure of said holographic recording medium so that interference in the recording medium between the reference beam and the phase vibrated beam segment is substantially weakened.

2. The apparatus of claim 1 wherein each phase modulator comprises an electrically actuable piezoelectric strip shaped element having a reflective surface at one end on which a segmental part of the signal beam impinges and wherein each piezoelectric element responds to the actuating state of the binary signal bit applied thereto so as to move the reflective surface longitudinally of the propagational direction of the signal beam.

3. The apparatus of claim 2 wherein each piezoelectric element is secured at a point along the length thereof removed from the reflective surface and poled perpendicular to the length dimension with the binary signal applied thereacross so as to vary the magnitude of the polarization of the piezo electric elements in accordance with the amplitude of the actuating state of the binary bits and thereby change the length dimension.

4. The apparatus of claim 3 wherein the actuating state of a bit is a step voltage for exciting a longitudinal vibratory mode of the piezoelectric element.

5. The apparatus of claim 3 wherein the actuating state of a bit is a cyclically varying voltage having a frequency corresponding to a longitudinal vibratory mode of the piezoelectric element.

6. The apparatus of claim 3 wherein the phase modulators are arranged in a linear array aligned parallel to a plane containing the reference and signal beams and further including means for moving the recording medium transversely of said plane.

7. The apparatus of claim 3 wherein the actuating state of the binary bit applied to the respective piezoelectric elements cyclically changes the polarization so as to sweep the length dimension through a range corresponding to a 180° cyclical phase variation of the segmental signal beam part incident on the actuated element.

* * * * *